US010595461B2

(12) United States Patent
Irarrazaval

(10) Patent No.: US 10,595,461 B2
(45) Date of Patent: Mar. 24, 2020

(54) AIR FRUIT FALL SPEED REDUCING SYSTEM

(71) Applicant: Eduardo Armstrong Irarrazaval, Santiago (CL)

(72) Inventor: Eduardo Armstrong Irarrazaval, Santiago (CL)

( * ) Notice: Subject to any disclaimer, the term of this patent is extended or adjusted under 35 U.S.C. 154(b) by 117 days.

(21) Appl. No.: 15/788,320

(22) Filed: Oct. 19, 2017

(65) Prior Publication Data

US 2019/0116734 A1   Apr. 25, 2019

(51) Int. Cl.
*A01D 46/26* (2006.01)
*A01D 46/28* (2006.01)

(52) U.S. Cl.
CPC ........ *A01D 46/264* (2013.01); *A01D 46/26* (2013.01); *A01D 46/28* (2013.01); *A01D 2046/262* (2013.01)

(58) Field of Classification Search
CPC ...... A01D 46/26; A01D 46/264; A01D 46/28; A01D 2046/262
See application file for complete search history.

(56) References Cited

U.S. PATENT DOCUMENTS

| 3,276,194 | A | * | 10/1966 | Mohn | ............. | A01D 46/005 56/330 |
| 3,535,864 | A | | 10/1970 | Smith | | |
| 3,601,964 | A | * | 8/1971 | Fisher | ............. | A01D 46/285 56/320 |
| 3,827,222 | A | * | 8/1974 | Toti | ............. | A01D 46/28 56/330 |
| 3,871,040 | A | | 3/1975 | Marasco | | |
| 5,074,107 | A | * | 12/1991 | Windemuller | ......... | A01D 46/28 56/12.8 |
| 5,191,758 | A | * | 3/1993 | Cote | ............. | A01D 46/26 56/329 |
| 2011/0167778 | A1 | * | 7/2011 | Sidhu | ............. | A01D 46/28 56/329 |
| 2014/0250853 | A1 | * | 9/2014 | Young | ............. | A01D 46/26 56/329 |
| 2017/0238465 | A1 | * | 8/2017 | Bodtke | ............. | A01D 46/28 |

FOREIGN PATENT DOCUMENTS

FR    2590111 A1 * 5/1987 ............. A01D 46/28

* cited by examiner

*Primary Examiner* — Alicia Torres
(74) *Attorney, Agent, or Firm* — Hamre, Schumann, Mueller & Larson, P.C.

(57) ABSTRACT

An agricultural mechanical harvesting system useable with a harvester machine. The system includes at least one airflow generator connected to nozzles via air conduction systems for ejecting pressurized air flows from the nozzles located in the harvester machine above fruit receiving units and under fruit harvester units. The nozzles are positioned above the fruit receiving units and under the fruit harvester units of the harvester machine.

9 Claims, 3 Drawing Sheets

AIR FRUIT FALL SPEED REDUCING SYSTEM

APPLICATION AREA

The present invention relates to an integral mechanical harvesting solution with machines, in which it improves the performance of standard harvesting machines which controls and reduces the damages of the fruit to be harvested, mainly produced by falling gravitationally and striking the surface receiver on machines.

BACKGROUND

The state of the art describes solutions that try to harvest fruits by means of flows and blows of air. U.S. Pat. No. 3,871,040 describes an apparatus for collecting fruit from trees by cutting them with pulsating jets of compressed air and mechanically collecting them in piles comprising a vertically mounted air tank guide element to which a blower unit is slidably attached which has nozzles at its end, said tank being also in fluid communication with additional auxiliary equipment for individually inverting the branches of the shaft and for collecting the cut fruit.

U.S. Pat. No. 3,535,864 discloses a fruit picking device for receiving fruit shaken from a tree, a frame, an elongated conveyor mounted on said frame and serving to transport fruit to one end of said frame, a generally rectangular flexible cloth adapted to be rolled and unwound for positioning on the floor below said shaft to receive the fruit shaken therefrom, a roll mounted on said elongate conveyor, one side of said sheet being held along said roll so that when the roll is driven. It further comprises an air cushion constructed of a plurality of material sections joined together to form airways extending longitudinally away from the roll, the channels are interconnected to an inlet chamber which is common to all longitudinal cushion channels and serves to distribute air through the cushion.

Describes a fruit harvester—Catching Frame—with rod support with endless collection means. The harvester comprises a pinion chain which is manipulated to rotate a nozzle simultaneously by means of bevel gears to an oppositely directed position. The compressed air passing upward through a handle and the air supply pipe enters the cavity of the pressure chamber where it is distributed through the nozzles and directed to the vanes of the turbine wheel. The air jets of the nozzles drive the wheels of the turbine in a common direction counterclockwise.

Technical Problem

As seen in the State of the Art crop systems do not try to stop the speed of fall of harvested fruits to eliminate choke stroke damage.

There is a need to implement a solution as an integral system to avoid the high percentage of fruit damage due to the traditional mechanical harvesting (current systems) that occur because of the gravitational fall of the fruits inside the mechanical harvesters at be struck against the receiving plates or surfaces.

SUMMARY OF THE INVENTION

The present invention relates to an agricultural mechanical fruit harvesting unit (110), which controls and reduces the rate of fall of fruits harvested by mechanical harvester machines (100). The present invention allows to increase the yields of conventional machines and to solve the problems of loss in the quality of harvested fruit.

This system is called Air Fruit Stopper, or AFS system (200). The system operates with the injection of a controlled air flow under certain conditions, ranges and parameters that allow the harvesters machines the controlled reduction of the speed of fall of the fruits detached by the machine from the plants, bringing as a consequence, the decrease of the percentage of damages and losses in the quality of fresh fruit or products harvested by machinery.

The AFS system (200) allows to solve the problem of crop damage caused by the fall of the fruit, as it temporarily reduces the speed of free fall of the fruit.

The AFS system (200) is an integrated mechanical fruit harvesting system, based on continuous and controlled airflow over mechanically harvested fruits, which fall gravitationally. The AFS system (200) can be applied or installed on harvesters currently used in the market, and new machines that require it. Current machines can be retrofitted to incorporate the AFS system (200). In addition to the above, AFS system (200) will allow the production of a new generation of delicate fruit harvesters (such as berries, cherries, citrus, olive, avocado, pomegranate, stone fruits, etc.) that include the AFS system (200) in order to reap greater quality of fruit destined for fresh consumption and fresh export and, in addition, to reduce the costs of the harvests. The AFS system (200) is applicable to any mechanical harvester machine (100) of fresh fruits, especially if they are delicate fruits, such as berries and others. It is also applicable to any mechanical harvester of non-fresh fruits, for example, European Hazelnut, Olives, Jojoba, Almond, Walnuts, Chestnut, etc.; also to the harvest of greater fresh fruits, as they are citrus, pomaceous, stone fruits, that require mechanical harvest; and in particular, to the harvest of seeds of any type requiring mechanical harvesting.

DETAILED DESCRIPTION OF THE INVENTION

Figure 1:
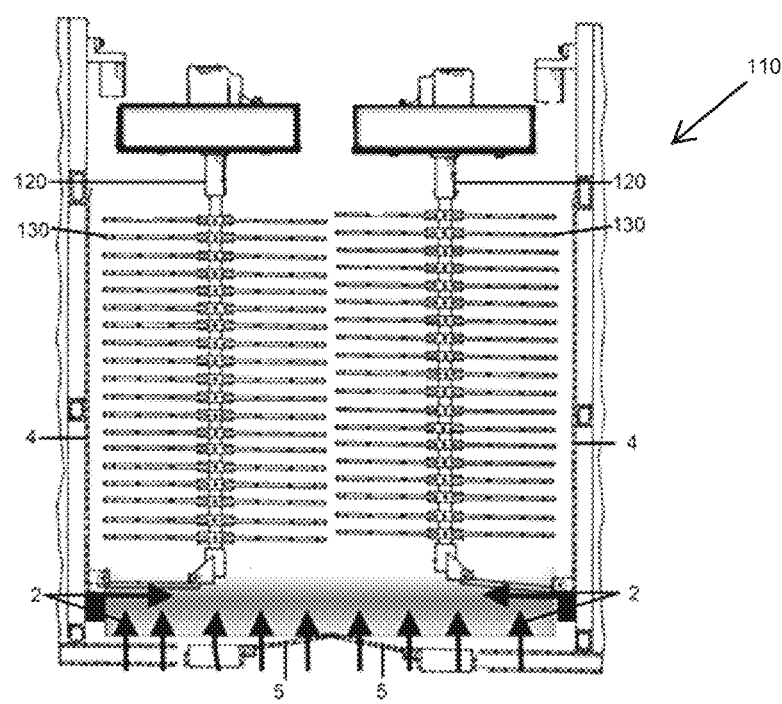
FIG. 1 corresponds to a front view of a harvester machine (100) with the AFS system (200), according to a preferred embodiment.
Figure 2A:
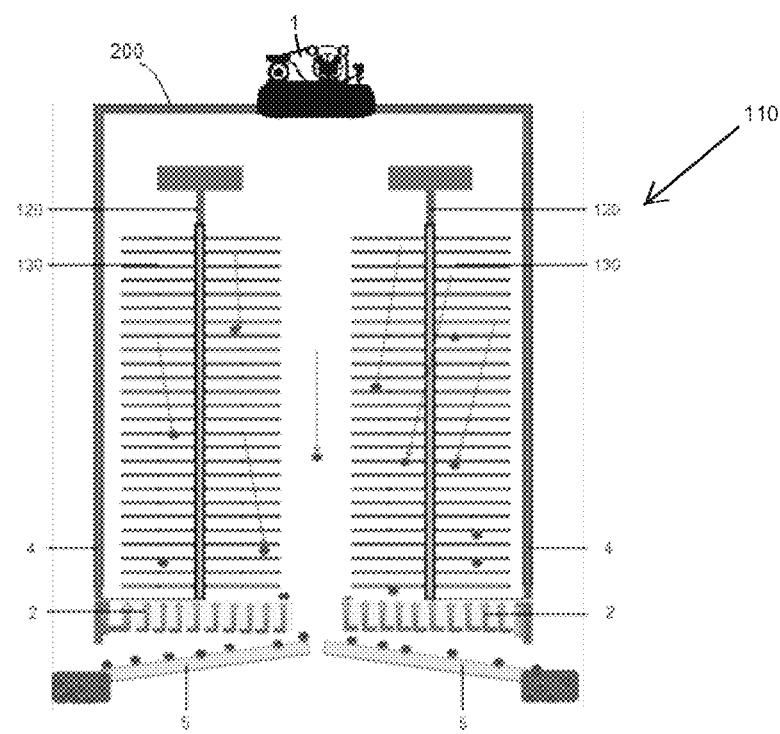
FIG. 2A corresponds to a front view of the harvester machine head with the AFS system (200), according to a preferred embodiment.
Figure 2B:
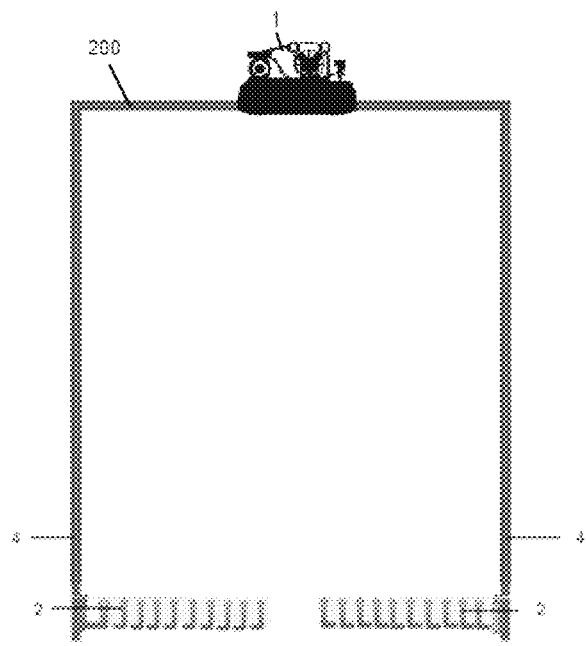
FIG. 2B corresponds to a front view of the AFS system (200), according to a preferred embodiment.

The agricultural mechanical harvesting system of the present invention, or Air Fruit Stopper, AFS system (200), operates with the injection of a flow of compressed air under controlled conditions, which allows the reduction of the rate of fall, decrease of damage.

The AFS system (200) comprises at least one airflow generator (1), a compressor or a turbine, operative to drive or suck air in adjustable flow ranges and powers, through one or more air conduction system (4) directed towards the sections of the respective ejection nozzles air (2).

The system further comprises at least one control panel (3) of each of the elements that make up the AFS system (200).

The system comprises at least two air conduction systems (4), between the airflow generator (1) and the outlet nozzles (2), which operate on each side of a harvester machine (left and right). The network of multiple nozzles (2) which are in the base and are all designed to reduce the speed of falling fruit. It is an aerodynamic system to stop the fall of the fruit that will operate on each side of the harvester machine (from the bottom up). To achieve this effect, a plurality of upward directional air outlet nozzles (2) are provided to reduce fruit fall velocity, directed at varying upward angles of the harvester machine (100). Their number can vary according to type and size of harvester machine (100) between 4 and 200 or more nozzles (2), depending on the need, and according to species and size of fruit or product to be harvested.

In a preferred embodiment of the invention the airflow generator (1), a compressor or a turbine, may be made of iron, brass, plastic or the like. The tubes are mainly in PVC and plastics, or metals. The materials of the nozzles (2) in the network are preferably in metal, copper or plastics of high strength and flexibility, as sanitary conditions.

Figure 3:
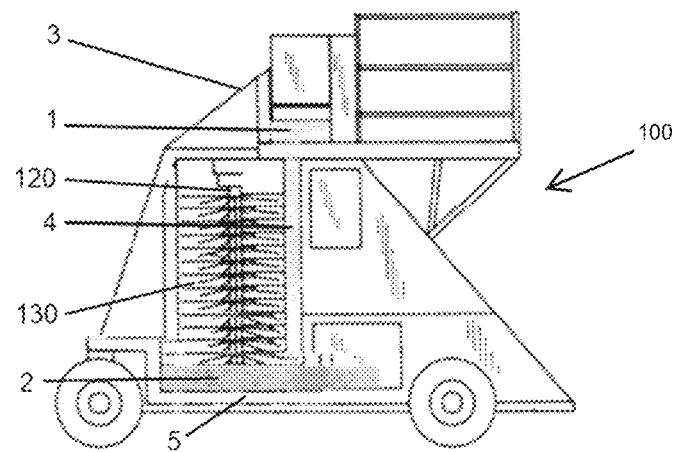
FIG. 3 corresponds to a side view of a harvester machine (100) with the AFS system (200), according to a preferred embodiment of the invention.
Figure 4:
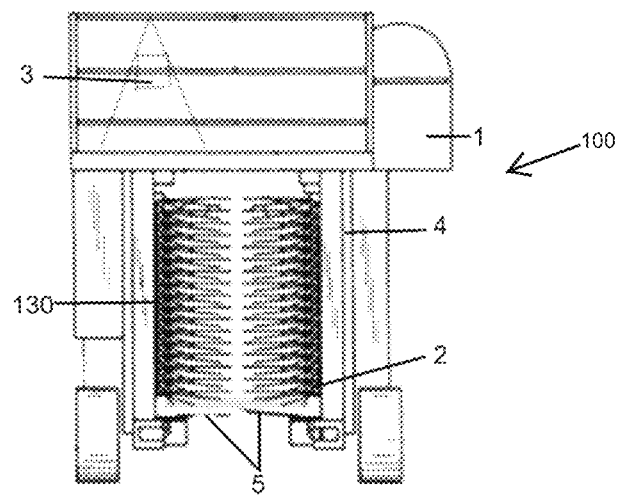
FIG. 4 corresponds to a side view of a harvester machine (100) with the AFS system (200), according to a preferred embodiment of the invention.

For traction of the harvester machine (100), a trailer can be used by means of a three-point connector and tractor power takeoff, which requires a conventional tractor of 40 to 220 HP of power that tows the harvester machine (100) where the AFS system (200) is installed. Or, the traction can be realized by means of an independent or self-propelled system, integrated to the same harvester machine (100), that has diesel engine or of another fuel to give own mobility to the system where the AFS system (200) is installed. In a preferred embodiment of the invention, the AFS system (200) is installed within the fruit harvesting unit (110) of a harvester machine (100) (FIGS. 3 and 4), which comprises at least two upright shafts (120), with a height varying from 1 to 4 meters from the ground, and with a distance between vertical axes of 0.30 to 4.5 meters (depending on model). The rotation of the shafts (2) will vary between 0.1 and 4 minutes or more, for 1 full turn. The height of the vertical shafts (120) varies from 1 to 4 meters in height (depending on the model and species of fruit or product to be harvested). Each of the shafts (120) comprise sequences of horizontal rods (130) inserted and intended to move the plants to achieve the gravitational fall of the fruits, which are arranged at different heights and with the angle of preference for each fruit to be harvested. The angle of the rods (130) is variable and adjustable. These can be installed at different angles, to achieve a better result according to the type of product, fruit or the degree of maturity to be harvested.

The rods (130) have an oscillatory vibrating capacity at their end, with an oscillation range between 1 cm and 80 cm. The measurements or the total length of each of the rods (130) will vary between 50 cm and 150 cm or more.

The rods (130) have the objective of releasing the fruits of the plants, so that they fall by their own gravitational weight, on the lower and receiving section of the fruit inside the machine. The AFS system (200) is preferably installed in the lower section between the fruit receiving units (5) and the height of the first rods (see drawings). The AFS system (200) is to be installed at a variable height, mostly from 1 cm to 60 cm above the fruit receiving units (5), and with a maximum width equivalent to the width of the fruit receiving unit (5). The length will be from the front to the back, or, with a minimum equivalent to the distance of two joined rods (130), and a maximum equivalent to the length of four rods (130).

The rotation of the shafts (120) as the vibration of the rods (130) is regulated and adjusted from an electro hydraulic control by means of the control panel (3).

The power supply for the harvester machine can be obtained by a traditional "take-up" system in the range of 540 and 2500 r.p.m. of a conventional Tractor of 40 to 220 HP (according to model) or, by the motor to fuel or electric of an independent or self-propelled unit.

The harvester machine (100) comprises energy receiving units, which receive power (force) for each of its mechanical components, for example: for motors and hydraulic components; the components that control the leveling of the machine against the ground; control of the speed of rotation of the shafts (120) where the rods (130) are; control of the power delivered by the fan(s), intended for cleaning fruit; control of the power delivered by the airflow generator (1), destined for the AF system (200); hydraulic control of opening of the shafts (120), between each other (which is variable between 0.30 and 4 meters, depending on the equipment model) and/or speed control of the conveyor belts that deliver the fruit from the fruit receiving units (5) to the type of box or container selected by the farmer.

As stated above, the basic principle of the AFS system (200) is Aerodynamic Levitation. Its construction depends on the design of the harvester machine (100) and the type of product (weight and diameter—volume of each species of fruit) but it is based on the same principles.

The airflow generator (1), expel the air flow against the products by means of multiple directional nozzles (2) and/or air curtains, duly regulated as to their position and air pressure exerted on the objects (fruits or agricultural products).

The invention claimed is:

1. An air fruit stopper (AFS) system configured for installation in a harvester machine having fruit receiving units and fruit harvesting units located above the fruit receiving units, wherein the AFS system comprises:
    at least one airflow generator that generates a flow of air;
    at least two air conduction systems fluidly connected to the at least one airflow generator and directing the flow of air therefrom, wherein the at least two air conduction systems are disposable on opposite sides of the harvester machine; and
    a plurality of nozzles that are fluidly connected to the at least two air conduction systems, the plurality of nozzles have air outlets directed upwardly that direct pressurized air upward, and the plurality of nozzles are configured to be mountable in the harvester machine above the fruit receiving units and under the fruit harvester units.

2. The system according to claim 1, further comprising at least one control panel.

3. The system according to claim 1, comprising at least four of the nozzles.

4. The system according to claim 1, wherein the at least one airflow generator is adjustable so as to adjust the speed of the flow of air generated thereby.

5. A harvester machine comprising:
    two fruit harvesting units having at least two vertical shafts, each of the shafts includes a plurality of horizontal rods configured to move plants to achieve gravitational fall of fruits from the plants;
    fruit receiving units located below the fruit harvesting units; and an air fruit stopper (AFS) system mounted on the harvester machine, the AFS system includes at least one airflow generator that generates a flow of air, at least two air conduction systems fluidly connected to the at least one airflow generator and directing the flow of air therefrom, wherein the at least two air conduction systems are disposed on opposite sides of the harvester machine, and a plurality of nozzles that are fluidly connected to the at least two air conduction systems, the plurality of nozzles have air outlets directed upwardly that direct pressurized air upward, and the plurality of nozzles are positioned above the fruit receiving units and under the fruit harvesting units.

6. The harvester machine according to claim 5, wherein the angle of the rods is variable and adjustable.

7. The harvester machine according to claim 5, wherein the shafts have a height varying from 1 to 4 meters from the ground, and with a distance between the shafts of 0.30 to 4 meters.

8. The harvester machine according to claim 5, wherein the rotation of the shafts is variable, with at least 0.1 minute for one full turn.

9. The harvester machine according to claim 5, wherein the rods have an oscillatory vibratory capacity at ends thereof with a range of oscillation between 1 cm and 40 cm and a total length of each of the rods varies between 50 cm and 150 cm.

\* \* \* \* \*